March 10, 1959

G. B. LONG ET AL 2,877,333

DOMESTIC APPLIANCE

Filed Jan. 14, 1955

INVENTOR.
George B Long and
BY Byron L. Brucken

R R Candor

THEIR ATTORNEY

March 10, 1959
G. B. LONG ET AL
2,877,333
DOMESTIC APPLIANCE
Filed Jan. 14, 1955
2 Sheets-Sheet 2
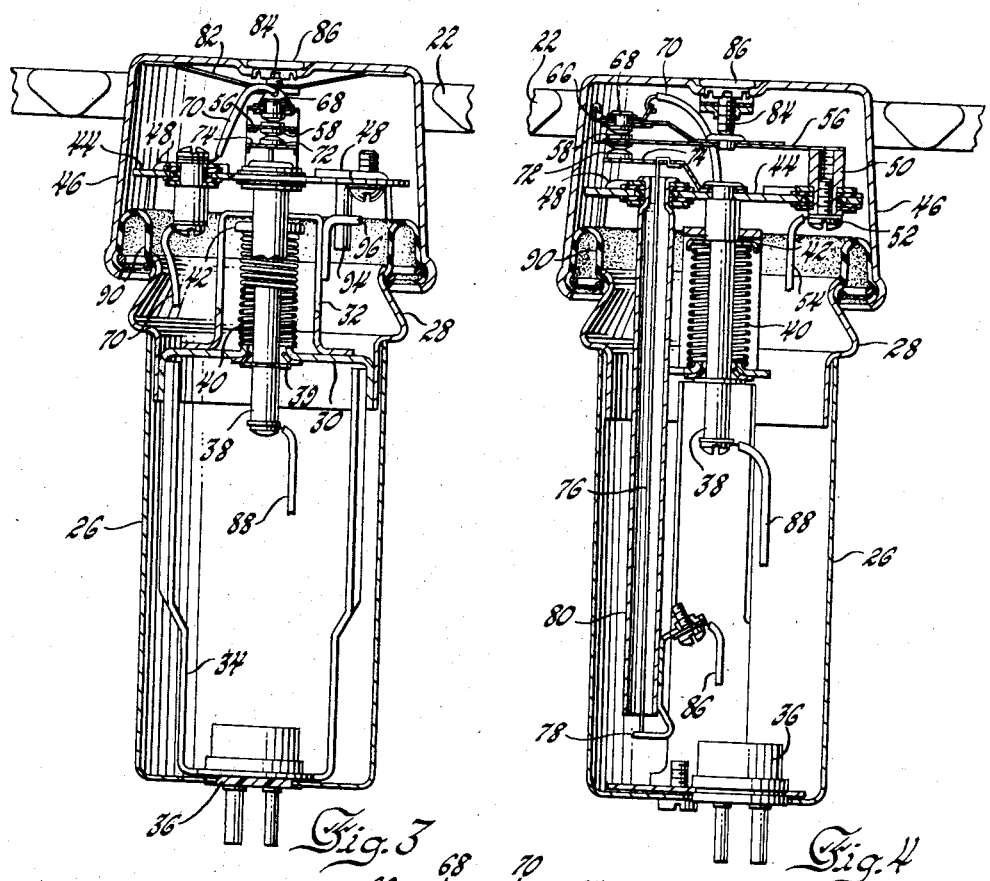
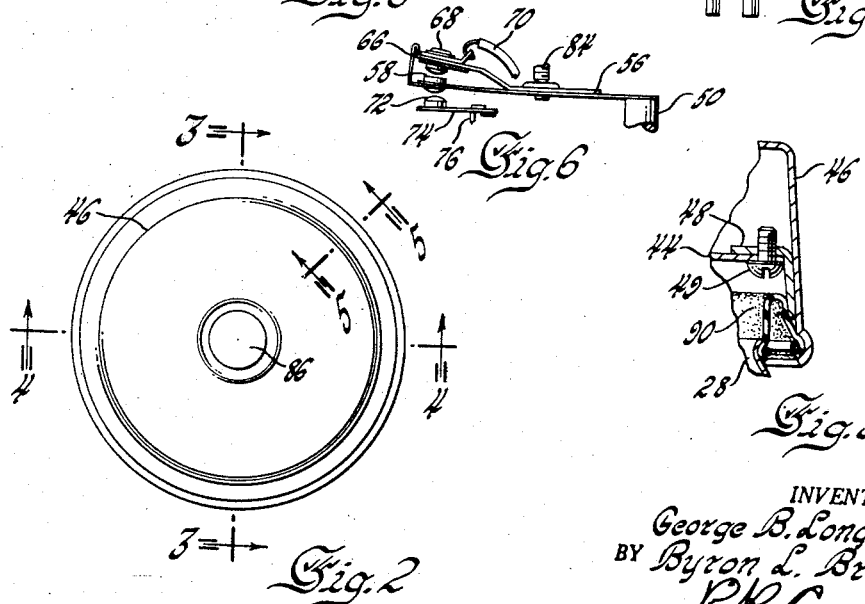
INVENTOR.
George B. Long and
BY Byron L. Brucken
R K Candor
THEIR ATTORNEY

United States Patent Office 2,877,333
Patented Mar. 10, 1959

2,877,333

DOMESTIC APPLIANCE

George B. Long and Byron L. Brucken, Dayton, Ohio, assignors to General Motors Corporation, Detroit, Mich., a corporation of Delaware Application January 14, 1955, Serial No. 481,728

8 Claims. (Cl. 219—20)

This invention relates to a domestic appliance and more particularly to thermostatic controls for surface heaters of electric ranges.

Difficulties in cooking could be minimized by providing a surface heater control which would provide a proper amount of heat at all times and especially prevent burning. If the heater is controlled solely according to the temperature of the vessel there is difficulty in preventing overshooting the temperature desired and also in providing different rates of boiling.

It is an object of this invention to provide an adjustable control primarily responsive to the temperature of the vessel and having a simple multiple stage control to provide fast warmups and to prevent overshooting and also responsive secondarily to the heating effect of the heater to provide different rates of boiling.

It is another object of this invention to provide a surface heater with a thermostatic control relay removable from the range.

It is another object of this invention to provide a temperature control for a surface heater which retains its calibration throughout its life.

It is another object of this invention to provide an improved inexpensive form of thermostat control which through a low voltage circuit controls a simple hot wire relay for controlling the heater.

It is still another object of this invention to provide an arrangement wherein the control of current through a taut hot wire connected to an adjusting device is used to select the operating temperature of a thermostatic control.

These and other objects are obtained in the form shown in which an inverted resiliently mounted brass cup is located in the center of a spiral tubular sheathed surface heater. The brass cup is bridged within by a strip of metal having a negligible coefficient of expansion. This strip operates a spring member carrying two sets of contacts in such a way that upon the deflection of the strip at low temperatures, these contacts are forced into contact with each other and with a third contact. These contacts are supported upon a mounting connected to the lower rim portion of a cup. The third contact is resiliently mounted and connected to the other upper end of a fine taut wire of Nichrome.

A four pronged plug individually connects the contacts and the taut wire to a mating receptacle connected to a dual hot wire relay. This relay includes two wire sections of very fine Nichrome wires operatively connected to switches which control the connection of the surface heater to the power source at two different voltages. An adjustable rheostat controls the current through the taut hot wire to adjust the operating temperature of the control contacts. The rheostat is combined with an on-off switch.

Further objects and advantages of the present invention will be apparent from the following description, reference being had to the accompanying drawings, wherein a preferred form of the present invention is clearly shown.

In the drawings:

Figure 2 is an enlarged top view of the temperature control shown in Figure 1;

Figure 3 is a vertical sectional view taken along the line 3—3 of Figure 2;

Figure 4 is a sectional view taken along the line 4—4 of Figure 2;

Figure 5 is a fragmentary sectional view taken along the line 5—5 of Figure 2; and Figure 6 is a diagrammatic view shown in an exaggerated fashion the opening of the upper contacts in the first operating stage.

Figure 1:
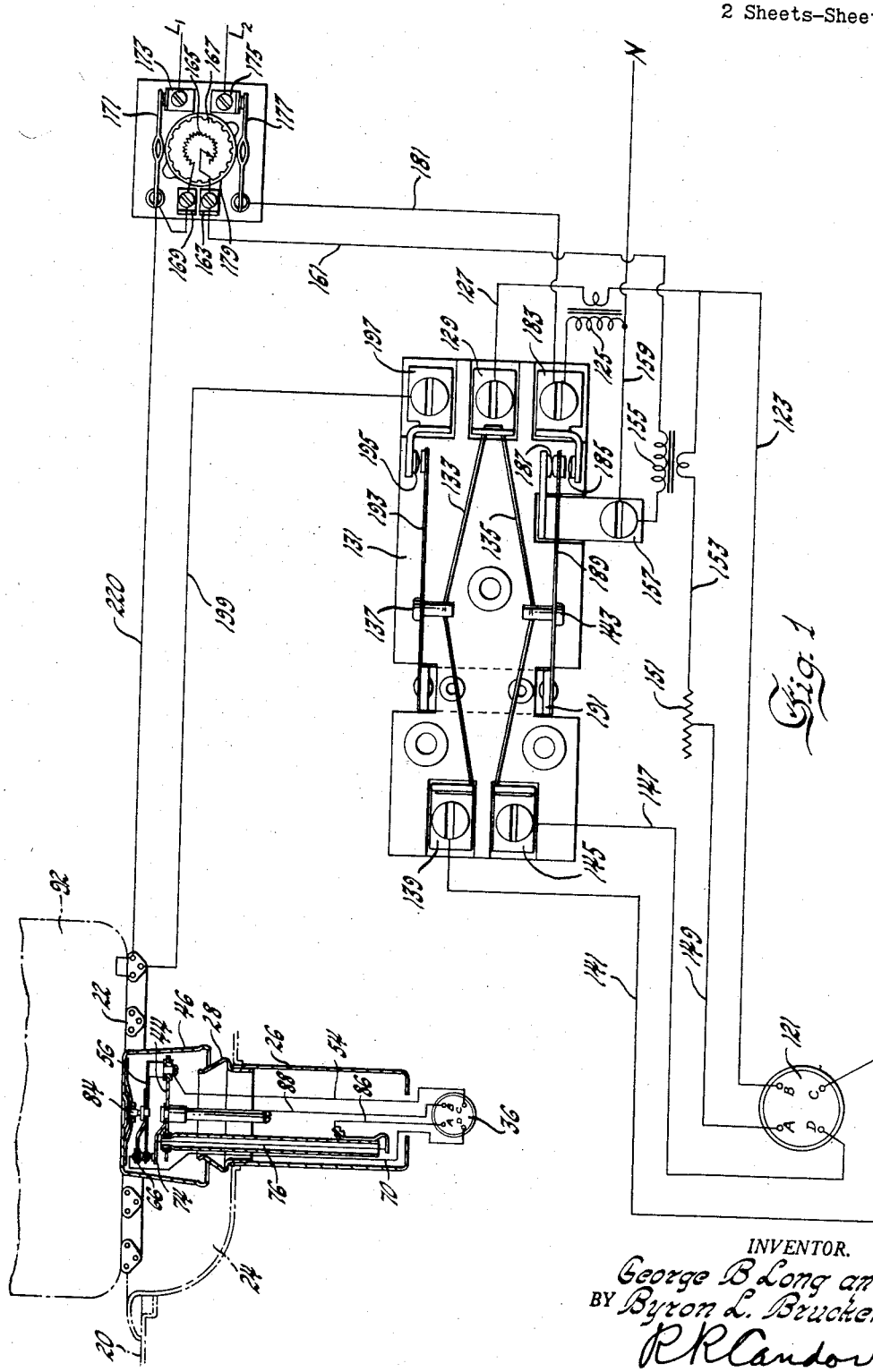
Figure 1 is a diagrammatic view showing the surface heater and electric range provided with a thermostatic control embodying one form of my invention.

Referring now more particularly to Figure 1 there is shown a range including a range top 20 provided with a tubular sheathed surface heater 22 which is formed into the shape of a spiral having a sheath which is triangular in cross section. Supported upon the range top 20 is the flange of a bowl-shaped drip pan 24. The center portion of the drip pan 24 is provided with a flanged aperture which supports a metal sleeve 26 provided with an upper flange 28. Referring now more particularly to Figures 2 to 6, the sleeve 26 is provided with a cross member 30 carrying an inverted U-shaped member 32 and the long U-shaped member 34. These parts are fastened together to form a rigid framework which at the lower end carries a four pronged connector 36 having prongs A, B, C and D.

A pin 38 extends through and is slidably mounted within apertures in the cross member 30 and the inverted U-shaped member 32. A compression type coil spring 40 surrounds the pin 38 and extends between the cross member 30 and the spring retainer 42 mounted on the pin beneath the inverted U-shaped member 32. The aperture in the cross member 30 is sufficiently large to permit limited angular movement of the pin 38. The pin 38 is provided with a stop washer 39 carrying a conical washer for centering the pin 38 in its upper position. The upper end of the pin 38 is formed into a rivet and is riveted to the contact mounting 44 as shown in Figure 4. The member 46 is prevented from rotating relative to the sleeve 76 by the pin 94 which engages a notch in an ear 96 provided on the member 32 as shown in Figure 3. This contact mounting 44 is fastened to the lower inner surface of an inverted brass cup-shaped member 46 by four inverted L-shaped brackets 48 which are bonded to the lower inner portion of the cup member 46 as shown in Figure 5. Screws 49 fasten the contact mounting 44 to the horizontal portion of the brackets 48 as shown in Figure 5. The mounting 44 is provided with a metal post 50. This post 50 is insulated from the mounting 44 and is provided with a terminal screw 52 connected by a conductor 54 to the terminal B of the plug connector 36. The top of the metal post 50 carries a spring leaf member 56 provided with a double contact 58 at its opposite end. The leaf spring 56 also has riveted to it a thin spring arm 60 carrying at its outer end an insulated contact 68 and sprung in such a way that when the leaf spring 56 is free to move upwardly as illustrated in Figure 6, the contacts 58 and 68 will be separated. This separation of the contacts 58 and 68 is limited by the hooked end of leaf spring 56 which hooks the outer end of the arm 66. This insulated contact 68 is connected by the conductor 70 to an insulated terminal on the mounting 44 and continues to the terminal A of the plug connector 36.

The bottom face of the double faced contact 58 is adapted to engage a contact 72 mounted upon the free end of the spring member 74 anchored in cantilever fashion to the mounting 44. The spring arm 74 is connected to and has its position adjusted by a taut fine wire 76 of Nichrome material connected at its opposite end to the terminal 78 fastened to the lower end of a tube 80 which may be of similar material. The upper end of this tube 80 is released and provided with an insulating connection with the mounting 44.

The positions of the contacts 58 and 68 are controlled by a bimetal arrangement which includes a bridging strip 82 bonded at its ends to the inner horizontal face of the inverted cup member 46 as illustrated in Figures 1 and 3. This bridging strip 82 is preferably of a material having a negligible coefficient expansion such as Invar. The bridging strip 82 has threaded through its central portion an Allen head adjusting screw 84 adapted to bear upon the rivet provided in the central portion of the strip 56, which rivet anchors the strip 66. The top of the inverted cup 46 is provided with a central aperture therein provided with a removable cover 86. This cover may be removed to adjust the Allen head screw 84. The Allen head screw prevents tampering with the adjustment since a serviceman is the only one having a suitable wrench for this screw. The terminal 78 upon the tube 80 is connected by the conductor 86 to the terminal A to the conductor 36 while the pin 38 is connected by the conductor 88 to the terminal B of the conductor 36. The interior of the cup 46 and the sleeve 26 is sealed by a resilient folded seal member 90 of silicone rubber which extends between the lower rim of the cup 46 and the upper rim of the sleeve 26. This seal member 90 is held in place by two spring rings which tend to connect its two portions to the lower and upper rims of the members 46 and 26.

The spring 40 projects the mounting 44 and the inverted cup 46 upwardly until it engages the bottom of the vessel placed thereon such as indicated by the reference character 92. The upper face of the member 46 is thereby made directly responsive to the temperature of the vessel 92 and its contents. Since the cup member 46 is of a material such as a brass having relatively high coefficient expansion, the strip 82 will be pulled upwardly as the temperatures increase and bowed downwardly as the temperatures decrease. This constitutes the primary temperature control. The second temperature control is provided by the heat emitted by the adjacent coils of the surface heater 22 to the upright walls 42 of the member 46. This heat transferred to the upright walls of the member 46 causes them to expand thereby moving the mounting 44 downward relative to the upper face of the member 46 and the bridging strip 82 as well as the metal screw 84 carried thereby. The strip 56, strip 74 and all three contacts will move downward with the mounting 44 to accelerate the separation of all of the contacts. This arrangement of the mounting 44 in such a way that it is responsive to the heating and expansion of the upright walls 46 minimizes overshooting and also provides an arrangement whereby the heater 44 may be cycled at various rates while water is boiling in the vessel 92 merely by varying the temperature adjustment of the taut hot wire 76.

The plug connector 36 makes a detachable connection with the receptacle 121 having mating terminals A, B, C and D receiving the corresponding terminals A, B, C and D of the plug connector 36. This makes a quick detachable connection whereby the entire unit shown in Figures 3 and 4 may be electrically disconnected and lifted completely out of the drip pan 24 and away from the surface heater 22 for testing, replacement and adjustment.

This connection connects the pin 38 through the conductor 88, the terminal B of the plug connectors 36 and 121 and the conductor 123 to one of the low voltage terminals of a 2½ volt step-down transformer 125. The other terminal of this transformer 125 is connected by the conductor 127 to an L-shaped relay terminal 129 upon a relay mounting 131 of electrical insulating material providing a base for all the parts of a dual hot wire actuated relay. The upstanding portion of the L-shaped terminal 129 is connected to the adjacent ends of two relay actuating sections 133 of .0001 inch Nichrome wire. The actuating section 133 passes through an aperture in the connection 137 of electrical insulating material and connects to the upstanding portion of the L-shaped terminal 139 at the other end of the relay mounting 131. The relay terminal 139 is connected through the conductor 141, the connectors C of the connections 36 and 121 and the conductor 54 to the spring contact member 56. The relay actuating wire section 135 extends through an aperture in the connection 143 of electrical insulating material and connects at its opposite end to the upstanding portion of the L-shaped terminal 145. This relay terminal 145 is connected through the conductor 147 and the terminals D of the connectors 121 and 36 and through the conductor 70 to the upper insulated contact 68. The hot wire adjustment 76 is connected through a relay control circuit including the conductor 86, the terminals A of the connectors 36 and 121 and the conductor 149 to an adjustable resistance or reactance 151 which in turn is connected by the conductor 153 to one of the low voltage terminals of the four volt step-down transformer 155. The second low voltage terminal of this transformer 155 is connected to the conductor 123.

One terminal of the primary of the transformer 155 is connected to the terminal 157 upon the mounting 131 and is connected by the conductor 159 to the neutral supply conductor N. The second terminal of the primary of the transformer 155 is connected by the conductor 161 to the terminal 163 of a rheostat or variable resistance 165 adjusted by the knob 167. The variable resistance 165 is connected to a second terminal 169 connecting with the on-off switch member 171 which connects through the terminal 173 with the live supply conductor $L_1$. The live supply conductor $L_2$ connects with the switch member 177. These switch members 171 and 177 are opened in the off position of the knob 167 by a two lobed cam 179. The variable resistance 165 is arranged so that its greatest resistance is in the off position of the knob 167 and its resistance gradually reduces as the knob 167 is turned away from the off position to higher temperature positions.

The switch member 177 is connected by conductor 181 to the terminal 183 upon the insulated mounting and to one of the primary terminals of the transformer 125. The other primary terminal of the transformer 125 is connected to the conductor 159 connecting with the neutral supply conductor N. The terminal 183 is provided with a contact 185 while the terminal 157 is provided with a contact 187 separated from the contact 185. A leaf spring contact member 189 has a double contact at one end operating between the contacts 185 and 187. This spring contact member 189 has its spring bias arranged to move its contact into engagement with the contact 185. The insulating connector 143 extends through an aperture in the spring contact member 189 and has a head in engagement with the outer face of the spring contact member 187 so that when the wire 135 is cold and contracts, the connector 143 will pull the spring contact member 189 into engagement with the contact 187. The spring contact member 189 is anchored to a connector bracket 191 extending across beneath the mounting 131 and providing a mounting for a second spring contact member 193.

This second spring contact member 193 has an aperture through which extends the insulated connector 137 having a head bearing upon the outer face of the spring contact member 193. The spring bias of the spring contact member 193 is upward or outward away from the wire sections 133 and 135 to normally carry it into contact with the contact 195 connected to the terminal 197. When the wire section 133 is cold and contracted, it will pull the spring contact member 193 away from the contact 195 as shown in Figure 1. The terminal 197 connects through the conductor 199 to one terminal of the surface heater 22. The other two terminals of the surface heater 22 are connected together and are connected by the conductor 220 and through the switch member 171 and to the live conductor L₁.

Operation

In the off position of the knob 167, all circuits are deenergized by the two diametrically opposite lobes of the cam 179 which engage and move to open position the spring contact members 171 and 177. When the knob 167 is turned away from the off position to any suitable selected position, the lobes of the cam 179 move away from the switch contact member 171 and 177 allowing them to close. The closing of the switch member 177 connects the live supply conductor L₂ through the switch member 171 and the conductor 181 to the terminal 183 and one terminal of the 2½ volt step-down transformer 125. The other terminal of the transformer 125 is connected to the supply conductor N. This energizes a circuit through the conductor 127, the terminal 129, the wire section 133 to the terminal 139 and through the conductor 141, the terminals C, the conductor 54, the spring contact member 56, the contact 58, the contact 68, the contact 72, the contact member 74, the pin 38, the conductor 88, the terminals B of the plug connectors 36 and 121 and the conductor 123 to the other secondary terminal of the transformer 125. At the same time current flows through a branch circuit which includes the wire section 135, the terminal 145, the conductor 147, the terminals D of the plug connectors 36 and 121 and the conductors 70 to the insulated contact 68 which connects through the contact 58 to the contact 72. The remainder of this circuit is the same as the previously mentioned circuit for the wire circuit 133. This current causes the wire sections 133 and 135 to heat up and expand allowing the spring bias of the contact member 193 to carry it into contact with the terminal 195 and allowing the spring bias of the contact member 189 to carry it into contact with the spring contact 185. This action is slow enough to prevent chattering or vibration of the contacts and particularly is slow enough to prevent flashing or arcing over of contacts 185, 187.

This causes a high voltage circuit for the heater 22 in which current flows to the live supply conductor L₁ through the terminals 173, the spring contact member 171, the conductor 220, the surface heater 22, the conductor 199, the terminal 197, the contact 195, the spring contact member 193, the cross connector 191, the spring contact member 189, the contact member 185, the terminal 183, the conductor 181, the spring contact 177, the terminal 175 to the second live supply conductor L₂. This will apply the maximum input of 236 volts to obtain the maximum heat from the surface heater 22.

The knob 167 also adjusts the rheostat 165. This causes an adjusted current flow from the live supply conductor L₁ through the terminal 173, the switch contact member 171, the short conductor to the terminal 169, the rheostat 165, the terminal 163, the conductor 161 to the one primary terminal of the transformer 155 which has its other primary terminal connected through the terminal 157 and the conductor 159 to the neutral supply conductor N. This variably energizes the transformer 155 at less than 118 volts depending upon the voltage drop through the rheostat 65. This transformer 155 has its output stepped down to less than four volts to variably energize the relay control adjusting circuit which includes the conductor 153, the adjustable resistance 161, the conductor 149, the terminals A of the plug connectors 121 and 36, the conductor 86, the taut wire adjustment member 176 which connects to the spring contact member 74. This current heats the taut wire 76 causing it to expand and allow the spring contact member 74 to move upwardly an amount in proportion to this current flow. An increased upward position of the contact 72 gradually raises the opening temperature of contact member 68 and the contact member 58.

When the vessel 92 reaches the temperature selected by the knob 167, the expansion of the upper face of the cup 46 will raise the strip 82 while the heat from the heater 22 on the upright walls will raise both the upper face and the strip 82 as well as the screw 84 so that the spring contact member 56 will bow upwardly as in Figure 6 separating the contact 68 from the contact 58. This deenergizes the wire section 135 causing it to contract and through the insulated connector 43 to pull the spring contact member 189 away from the contact member 185 into contact with the contact member 187. This changes the connection of the spring contact member 189 from the conductor 181 and the live supply conductor L₂ to the terminal 157, the conductor 159 and the neutral supply conductor N. This change reduces the voltage applied to the heater 22 from 236 volts to 118 volts thereby reducing the heating rate to ¼ the maximum amount.

An additional rise in temperature of the vessel 92 or continued heating by the heater 22 or a combination of both will cause the contact 58 to separate from the contact 72. This will deenergize the wire section 133 causing it to contract and through the insulated conductor 187 to pull the spring contact member 193 away from the contact 195. This will completely deenergize the surface heater 22. This deenergization will limit the temperature of the heater 22 and the vessel 92 to prevent burning of the contents of the vessel 92 in the event that the contents should boil dry. It will also limit the temperatures to values in proportion to the position of the knob 167.

For a low boil, the knob 167 is set to a value to give a high resistance in the rheostat 165 so that the upper contact 68 will open before the boiling point is reached. This reduces the heat to prevent excessive boiling. The heating effect of the heater upon the side portions of the cup member 46 causes the contacts 58 to cycle out of and into engagement with the contact 72 to intermittently open and close the contact members 193 and 195 to limit the average heat provided by the heater 22 to an amount suitable for a slow boil. For fast boiling the knob 167 is turned to decrease the resistance of the rheostat 165 to provide a greater current flow through the taut wire 76 to allow the contact 72 to move higher. Since boiling water maintains substantially the same temperature the strip 82 will remain substantially in the same position relatively to the upper face of the inverted member 46. However, the heating effect of the heater 22 on the side walls of the inverted cup member 46 will cause the cycling of the contacts 58, 193 and 195 to limit the average heating of the heater 22. However in this higher position of the contact 72 the heater 22 will be energized a greater proportion of the time to provide sufficiently more heat for a fast boil.

In accordance with the provisions of Rule 78a, reference is made to the following prior filed applications: S. N. 407,746, now abandoned, and S. N. 407,747, now Patent 2,820,129, filed February 2, 1954.

While the form of embodiment of the invention as herein disclosed constitutes a preferred form, it is to be understood that other forms might be adopted, as may come within the scope of the claims which follow.

What is claimed is as follows:

1. An electric surface heating system including an electric surface heater having an aperture therein, an inverted cup member within said aperture adapted to be contacted by a vessel upon the surface heater, a mounting supported by the lower portion of said cup, a bridge member of a material having a different coefficient of expansion than said cup spanning two points on the top of said cup, a contact mechanism electrically connected to said heater, a screw transmitting the movement of said bridge member to said contact mechanism to operate said contact mechanism to open and closed positions, said cup member having an access opening providing access to said screw, and a removable cover for said access opening.

2. An electric surface heating system including an electric surface heater having an aperture therein, a thermostatic control having an element within said aperture adapted to be contacted by a vessel supported upon the surface heater, said control including three contacts and temperature responsive means for first closing two of said contacts and thence bringing the third into contact with one of said two contacts and for opening said contacts in the reverse order, a first double throw relay having an operating means connected in series with two of said three contacts for energizing said heater at a high or low rate, and a second relay having an operating means connected in series with the third of said three contacts for deenergizing said heater.

3. An electric surface heating system including an electric surface heater having an aperture therein, a thermostatic control having an element within said aperture adapted to be contacted by a vessel supported upon the surface heater, said control including three contacts and temperature responsive means for first closing two of said contacts and thence bringing the third into contact with one of said two contacts and for opening said contacts in the reverse order, a first double throw relay having an operating means connected in series with two of said three contacts, said relay having one contact connected to the heater and other contacts connected to high and low voltage supply sources for energizing said heater at a high or low rate, and a second relay having an operating means connected in series with the third of said three contacts and having contact means connected in series with said heater.

4. An electric surface heating system including an electric surface heater having an aperture therein, an inverted cup member within said aperture adapted to be contacted by a vessel upon the surface heater, a bridge member of a material having a different coefficient of thermal expansion than said cup located within said cup and having its end portions fastened to the bottom of the top of said cup and having its intermediate portion spanning said cup to form a bridge between said end portions, mounting within said cup, a first contact member movably mounted upon said mounting and operably connected to said bridge member, a second contact member movably mounted upon said mounting and adapted to be engaged by said first contact, said contacts being electrically connected to said heater, a strut supported by said mounting, a wire having one portion connected to said strut and another portion connected to said second contact member, an electrical heating circuit for said wire to adjust its length, and control means for said heating circuit to vary the current through said wire to adjust the position of said second contact.

5. An electric range including a range top provided with an electric heater, said heater being provided with a centrally located thermostatic switch means, a control means remote from said heater and thermostatic switch means provided with manual manipulating means, said control means being provided with control switch means connected to and operated by said manipulating means for connecting said heater to a supply source, a relay for controlling said heater, said relay having electrical operating means, a relay control circuit controlled by said control switch means and connecting said electrical operating means and said thermostatic switch means, an electrically operable adjusting means for said thermostatic switch means, and an electric circuit portion and a current regulating means controlled by said manual manipulating means and controlled by said control switch means for controlling said adjusting means.

6. An electric range including a range top provided with an electric heater, said heater being provided with a centrally located thermostatic switch means, a control means remote from said heater and thermostatic switch means provided with manual manipulating means, said control means being provided with control switch means connected to and operated by said manipulating means for connecting said heater to a supply source, a relay for controlling said heater, said relay having electrical operating means, a relay control circuit controlled by said control switch means and connecting said electrical operating means and said thermostatic switch means, said thermostatic switch means including a thermostatically movable switch contact and a cooperating contact and a thermally expansible and contractible wire connected to said cooperating contact for moving said cooperating contact away from and toward said thermostatically movable contact, and an electric circuit portion and a current regulating means controlled by said manual manipulating means connected in series with said wire for adjusting said cooperating contact, said electric circuit portion being controlled by said control switch means.

7. In combination, an electrical device to be controlled, a contact means electrically connected to control said device, a condition responsive means operably connected to said contact means for opening and closing said contact means to control said electrical device, said contact means having a mechanically adjustable element for mechanically adjusting the opening and closing thereof relative to the condition of the condition responsive means, an anchorage, a taut resistance wire mechanically and electrically connected between said adjustable element and said anchorage to hold said adjustable element in adjusted position, said adjustable element being mechanically biased to oppose the pull of said wire to hold said wire taut, an electric heating circuit for said resistance wire, and control means for said heating circuit to vary the current through said wire to adjust its length to mechanically vary the position of said adjustable element.

8. An electric range having a surface heating system including an electric surface heater having an aperture therein, a thermostatic control device located in said aperture provided with contact means for controlling said heater, said control device including electrical means for adjusting the operation of said contact means, adjustable current controlling means for controlling said surface heater, and quickly separable multiple terminal plug and socket connectors and conductors removably connecting said current controlling means and said electrical means and said thermostatic control device.

References Cited in the file of this patent

UNITED STATES PATENTS

| | | |
|---|---|---|
| 1,626,515 | Cook | Apr. 26, 1927 |
| 2,137,073 | Bletz | Nov. 15, 1938 |
| 2,399,423 | Bletz | Apr. 30, 1946 |
| 2,410,013 | Clark | Oct. 29, 1946 |
| 2,530,643 | Berg et al. | Nov. 21, 1950 |
| 2,584,924 | Reingruber et al. | Feb. 5, 1952 |
| 2,606,990 | Akeley | Aug. 12, 1952 |
| 2,689,283 | Pulvari | Sept. 14, 1954 |
| 2,700,083 | Harmon | Jan. 18, 1955 |
| 2,767,296 | Welch | Oct. 16, 1956 |
| 2,806,122 | Thunander | Sept. 10, 1957 |